March 12, 1968 C. E. ARMOUR ETAL 3,372,574
FRICTIONAL SENSITIVITY TESTING APPARATUS
Filed Jan. 12, 1966 3 Sheets-Sheet 1

INVENTORS.
CARL ARMOUR,
CARROLL MORRISON,
PAUL SCOTT,
LLOYD SMITH and
GARRY WEINGARTEN
ATT'YS March 12, 1968   C. E. ARMOUR ET AL   3,372,574
FRICTIONAL SENSITIVITY TESTING APPARATUS
Filed Jan. 12, 1966   3 Sheets-Sheet 2

INVENTORS.
CARL ARMOUR, CARROLL MORRISON,
PAUL SCOTT, LLOYD SMITH and
GARRY WEINGARTEN

*N. H. Losche*
*Paul S. Collignon*
ATT'YS.

INVENTOR
CARL ARMOUR, CARROLL MORRISON,
PAUL SCOTT, LLOYD SMITH and
GARRY WEINGARTEN
ATT'YS.

United States Patent Office 3,372,574
Patented Mar. 12, 1968

3,372,574
FRICTIONAL SENSITIVITY TESTING APPARATUS
Carl E. Armour, Bloomfield, Carroll C. Morrison, Bedford, Paul E. Scott, Lyons, and Lloyd A. Smith, Bedford, Ind., and Garry Weingarten, Morris Plains, N.J., assignors to the United States of America as represented by the Secretary of the Navy
Filed Jan. 12, 1966, Ser. No. 520,193
3 Claims. (Cl. 73—35)

ABSTRACT OF THE DISCLOSURE

A device for determining the relative frictional sensitivity of a pyrotechnic material by counter-balancing, with a weight, a rotational force applied by a rotating shaft to a quantity of pyrotechnic material held in a container which is mounted on a cam, said weight being attached to one end of a cord with the other end of said cord being attached to said cam whereby a variable torque arm is provided and whereby the amount of rotation of said cam and the time required for ignition of said pyrotechnic material determines the relative frictional sensitivity of said pyrotechnic material.

---

The invention described herein may be manufactured and used by or for the Government of the United States of America for governmental purposes without the payment of any royalties thereon or therefor.

The present invention relates to a device for testing and evaluating the frictional property of materials, and more particularly to a test apparatus for determining the frictional sensitivity of pyrotechnic materials.

There is an inherent danger in the manufacture, packaging, and shipping of pyrotechnic materials, and it is often desirable to know the degree of sensitivity that a particular pyrotechnic material will have to friction. Heretofore, a standard testing apparatus used for determining friction sensitivity of pyrotechnic materials consisted of a swinging pendulum that was fitted with a shoe which is adapted to swing across a test sample that is placed on a friction anvil. This pendulum type testing apparatus has two shortcomings, one being that the test data was not reproducible on different machines, and another disadvantage being that an impact factor was included in the test result.

The present invention provides an improved method and device for evaluating the frictional sensitivity of pyrotechnic materials by engaging a spinning shaft with a quantity of pyrotechnic material held in a refractory container. The refractory container is mounted on a rotatable cam and a force is transmitted to the cam due to the friction between the spinning shaft and the pyrotechnic material. This force rotates the cam, which is weighted, and a variable lever arm is provided by the cam to provide a variable torque. The time required to ignite the quantity of pyrotechnic material is recorded, along with the angle of rotation of the cam, and a factor for frictional sensitivity can be determined.

It is therefore a general object of the present invention to provide an improved method and device for determining the relative frictional sensitivity of pyrotechnic material.

Another object of the present invention is to provide a novel device for determining the amount of frictional force being applied to a pyrotechnic material.

Other objects and advantages of the present invention will be readily appreciated as the same becomes better understood by reference to the following detailed description when considered in connection with the accompanying drawings wherein.

Figure 4A:
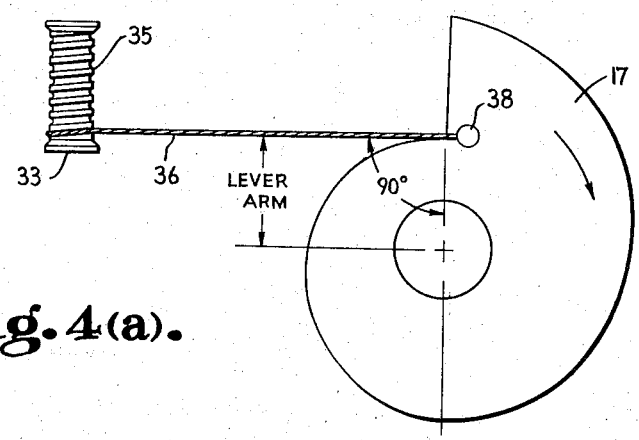
Figure 4B:
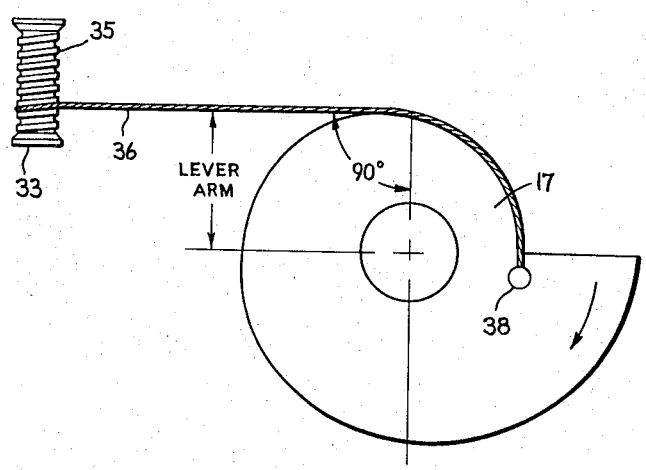

FIGURE 4(a) and FIGURE 4(b) are diagrammatic views illustrating the variable torque arm of a cam.

Referring now to the drawings there is shown a base plate 11 that is supported on a table 12 which is slidably attached to column 13. Column 13 also holds head 14 that supports the necessary mechanism to turn a spindle 15. A shaft 16 is attached perpendicular to base plate 11, and a cam 17 is rotatably mounted onto shaft 16 by means of bearings 18 and 19. By way of example, the profile of cam 17 is cut so that it will provide uniform motion, that is, the radius increases at a uniform rate. A container 21 is attached to the top cam 17 by means of screws 22, and a hole 23 is provided for holding a sample holder 24 which is made of a refractory material.

A dial plate 25, having a center hole 26 therein, is attached to base plate 11, and lines and numbers representing degrees are provided on the top surface of dial plate 25. A bushing 27 is positioned in center hole 26 and a flange 28 thereon, and a dial 29, having a pointer 31, is rotatably positioned on flange 28. A pin 32 is provided on cam 17 and extends downwardly so that it engages the edge of pointer 31. It can thus be seen that when cam 17 is rotated, pin 32 moves pointer 31 relative to dial plate 25 and the amount of rotation of cam 17 will be indicated.

A pulley 33 is rotatably mounted on a bracket 34 which is attached to base plate 11. Pulley 33 is provided with a spiral groove 35 and a cord 36 is passed over pulley 33 and seats in groove 35. A hook 37 is attached to one end of cord 36 and the other end of cord 36 is attached to cam 17 by means of pin 38. A weight 39 is attached to hook 37 to apply a force on cam 17.

Figure 1:
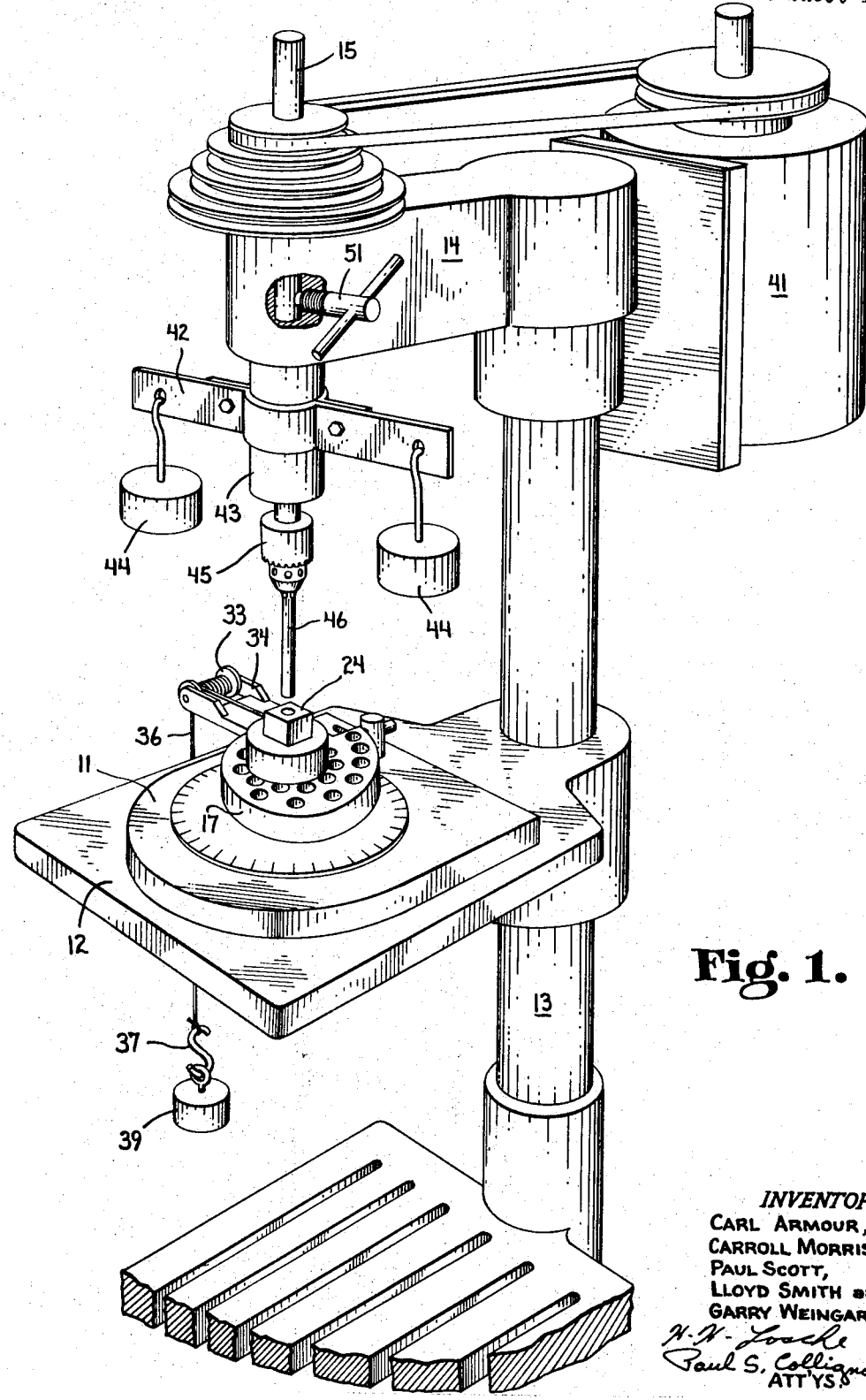
FIGURE 1 is a perspective view of a preferred embodiment of the present invention.
Figure 2:
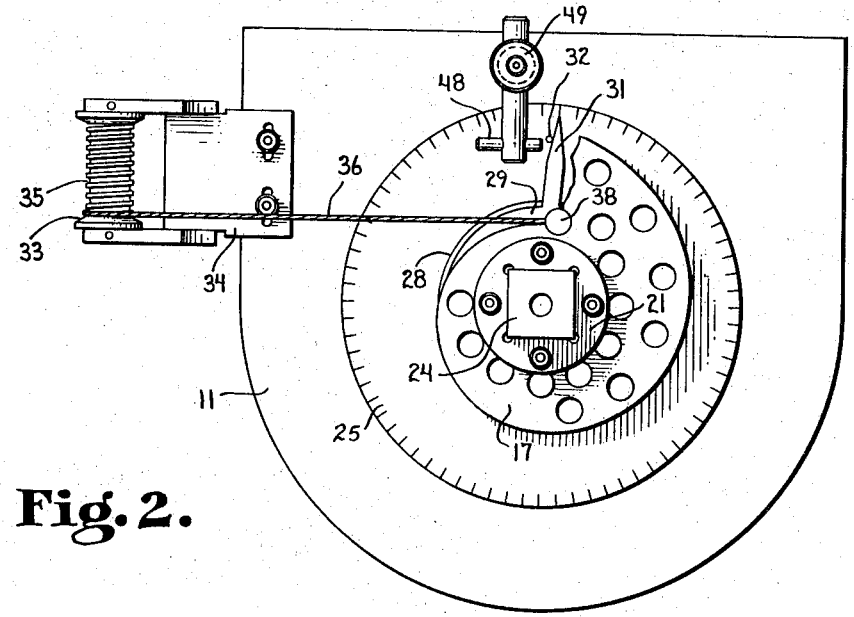
FIGURE 2 is a top plan view of a cam device for providing torque.
Figure 3:
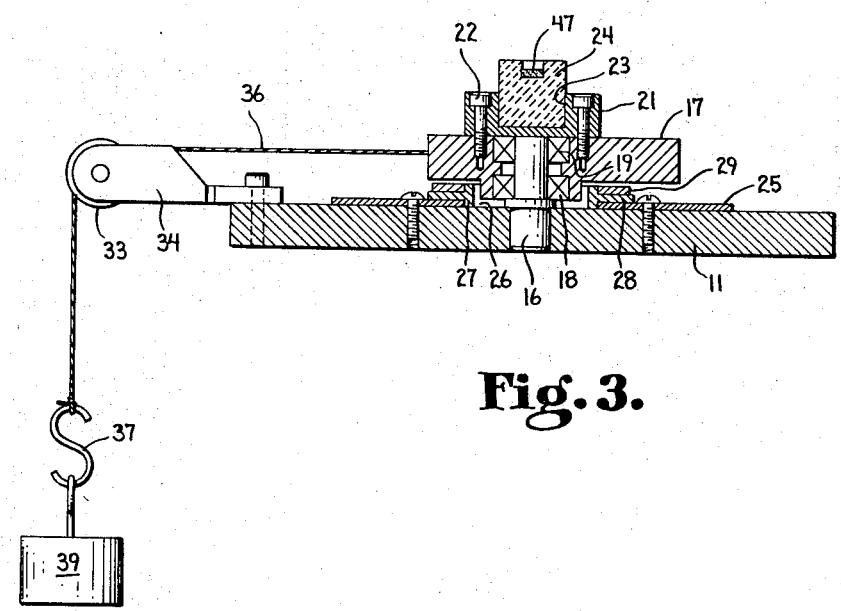
FIGURE 3 is a sectional view taken on line 3—3 of FIGURE 2.

Referring specifically to FIGURE 1 of the drawings, spindle 15 is slidable in a vertical direction in head 14 and is rotatable in a clockwise direction by motor 41 through a belt and pulley drive system. A yoke 42 is attached to the enlarged diameter portion 43 surrounding spindle 15 and weights 44 are selectively hooked to yoke 42. A standard chucking device 45 is provided on the end of spindle 15 and rod 46 is secured by chucking device 45 with the end of rod 46 being engageable with pyrotechnic material 47 which is held by sample holder 24. The desired force between the end of rod 46 and the pyrotechnic material 47 is determined by the amount of weights that are attached to yoke 42.

In order to facilitate the holding of spindle 15 in an upward extending position when a test is not being run, a locking arm 51 is threadedly attached to head 14 and engageable with spindle 15 to lock spindle 15 against vertical movement.

In operation, a small quantity of pyrotechnic material 47, for example 20 milligrams, is placed in holder 24 and an appropriate weight 39 is attached to cord 36. Weight 39 causes cam 17 to be rotated against stop 48 which is attached to base plate 11 by means of post 49. Pointer 31 is manually rotated in a counterclockwise direction until it engages pin 32. The torque converter is now ready for operation. A predetermined amount of weights 44 are added to yoke 42 and then motor 41 is energized to rotatably drive spindle 15 and, consequently rod 46, in a clockwise direction. When spindle 15 and rod 46 are rotating at the desired speed, they are lowered so that the end of rod 46 engages the pyrotechnic material 47 in sample holder 24. At the moment that rod 46 engages the pyrotechnic material, a timer is started, and then stopped when the pyrotechnic material is ignited.

The amount of force applied to the pyrotechnic material 47 by rod 46 is proportional to the amount of weights 44 that are attached to yoke 42.

The frictional force between the end of rod 46 and the pyrotechnic material 47 will cause cam 17 to be rotated in a clockwise direction and cord 36 will wind onto the outer periphery of cam 17 thereby raising weight 39. As cam 17 is rotated, the lever arm through which weight 39 is acting is increased, as the lever arm is equal to the distance from the center of cam 17 to the largest radius on the cam touching cord 36. As illustrated in FIGURE 4 of the drawings, as the lever arm is increased, the groove 35 in pulley 33 causes cord 36 to move an amount equal to the change in radius so that cord 36 will always be perpendicular to the same line passing through the center of cam 17. It can be seen that as cam 17 is rotated, an ever increasing torque force is being applied to counterbalance the frictional force between rod 46 and pyrotechnic material 47. When the torque force applied by weight 39 acting through its lever arm equals or counterbalances the frictional force between rod 46 and pyrotechnic material 47, cam 17 will stop rotating.

As pin 32 is attached to cam 17, pin 32 will be rotated with cam 17 and will cause dial 29 to be rotated. Thus pointer 31 will indicate on dial plate 25 the amount of rotation of cam 17. By knowing the amount of rotation of cam 17, the lever arm can then be readily ascertained and by multiplying the weight of weight 39 by the lever arm the torque force needed to counterbalance the frictional force can be determined. By knowing this value and the time required to ignite the pyrotechnic material 47, a factor can be determined for the relative frictional sensitivity of a particular pyrotechnic material.

It can thus be seen that the present invention provides an improved device for determining the relative frictional sensitivity of a pyrotechnic material.

Obviously many modifications and variations of the present invention are possible in the light of the above teachings. It is therefore to be understood, that within the scope of the appended claims the invention may be practiced otherwise than as specifically described.

What is claimed is:

1. A device for determining the relative frictional sensitivity of a pyrotechnic material by counterbalancing a rotational force applied to a quantity of said pyrotechnic material until ignition, said device comprising:
   a base plate,
   a cam rotatably attached to said base plate,
   means on said cam for holding a quantity of pyrotechnic material,
   a shaft rotatably fixed relative to said base plate and rotatably engagable with said pyrotechnic material whereby friction between said shaft when rotating and said pyrotechnic material causes said cam to be rotated,
   means for applying a selected force to said shaft during rotational engagement of said shaft with said pyrotechnic material, and
   means for applying a force of known value to the periphery of said cam tending to oppose rotation thereof whereby said force acting through a changing lever arm counterbalances the frictional force that rotates said cam thereby stopping rotation of said cam whereby the amount of rotation of said cam and the time required for ignition of said pyrotechnic material determines the relative frictional sensitivity of said pyrotechnic material.

2. A device for determining the relative frictional sensitivity of a pyrotechnic material as set forth in claim 1 wherein said means for applying a force of known value to said cam comprises:
   a pulley attached to said base plate,
   a cord engaging said pulley and having one end attached to said cam, and
   a weight of known value attached to the other end of said cord.

3. A device for determining the relative frictional sensitivity of a pyrotechnic material as set forth in claim 2 wherein said pulley is provided with a helical groove for seating said cord.

References Cited

UNITED STATES PATENTS

| | | | |
|---|---|---|---|
| 2,091,022 | 8/1937 | Stuart | 73—9 |
| 2,096,222 | 10/1937 | Bock | 73—59 |
| 2,360,059 | 10/1944 | Hohwart | 73—7 |
| 3,205,698 | 9/1965 | Shaw | 73—9 |

OTHER REFERENCES

Harry Diamond Laboratories Bulletin No. 8, Jan. 21, 1965, "Cam-Drum Torquemeter," Billy M. Horton, located in class 73—134.

LOUIS R. PRINCE, *Primary Examiner.*

JEFFERY NOLTON, *Assistant Examiner.*